Patented June 17, 1952

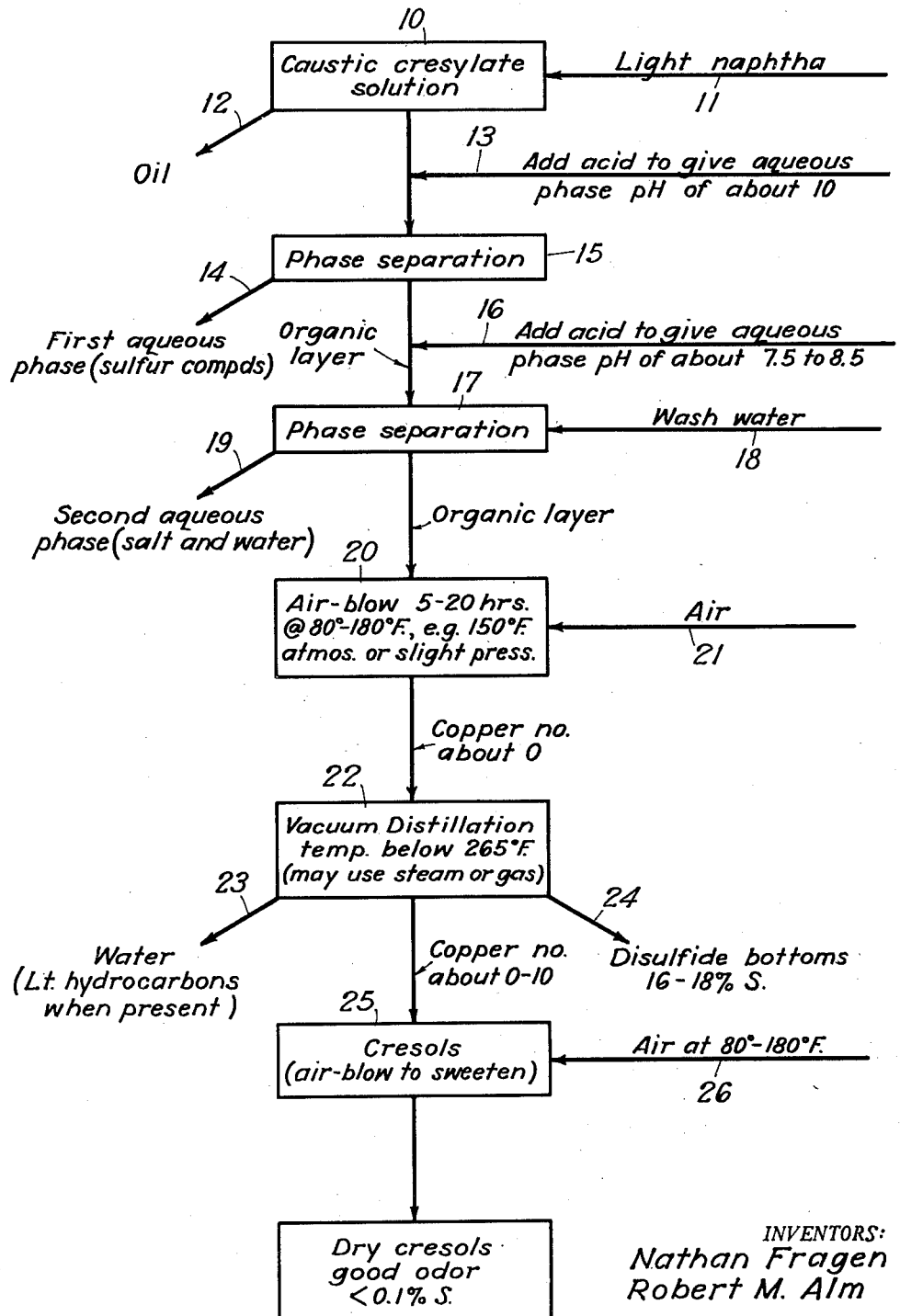

2,600,621

UNITED STATES PATENT OFFICE 2,600,621

OBTAINING PURIFIED PHENOLS AND CRESOLS OF PETROLEUM ORIGIN

Nathan Fragen, Hammond, and Robert M. Alm, Highland, Ind., assignors to Standard Oil Company, Chicago, Ill., a corporation of Indiana Application August 3, 1949, Serial No. 108,276

2 Claims. (Cl. 260—627)

This invention relates to obtaining purified phenols and cresols of petroleum origin and it pertains more particularly to an improved process for refining a so-called caustic cresylate solution containing materials extracted from petroleum refinery cracked naphtha distillates when said distillates are scrubbed with aqueous caustic solutions.

It has long been known that phenol and cresols may be obtained from cracked gasoline by washing with an aqueous caustic solution (Ind. Eng. Chem., vol. 16, No. 6, June, 1924, p. 587). The product obtained by acidifying a caustic wash was called "petroleum cresylic acid" and products of this type are herein referred to as cresols although it should be understood that phenol, and perhaps xylenols, may be contained in it. Cresols form petroleum are characterized by the presence of a considerable number of impurities, chiefly sulfur compounds, which make them unsuitable for many purposes. A large number of patents (e. g. U. S. 2,163,227) have been issued on various processes for refining crude petroleum cresols, but all of such processes are open to one or more serious objections. For example, the air blowing of a caustic cresylate solution has been perhaps most widely used, but this process usually requires the use of an oxidation catalyst (note U. S. 2,015,038, 2,467,355, etc.), and we have found that even when hydroquinone is used as an oxidation catalyst for blowing caustic cresylate solutions, the blowing step may require as long as 60 hours and even then result in a product having a copper number of the order of about 500. An object of our invention is to provide an improved method of purifying cresols of petroleum origin which will be simpler, less expensive, and more effective than processes heretofore employed, which will not require the use of an oxidation catalyst and which will produce more highly purified products. Other objects will be apparent as the detailed description of the invention proceeds.

We have found that if the original caustic cresylate solution is partially acidified to give an aqueous phase having a hydrogen ion concentration of about pH 10 and a phase separation is thereafter effected, about 80% to 90% of the total cresols will be separated in the organic layer, but most of the sulfur originally present will be eliminated in the aqueous layer. The organic layer may be only about a half to one-third the volume of the original cresylate solution, but with this separation at about pH 10, a large amount of water and salts are occluded in the organic layer. Further acidification of the organic layer is, therefore, effected to give a second aqueous phase having a hydrogen ion concentration below pH 9, and preferably in the range of pH 7.5 to 8.5. Acidification to this point, coupled with addition of wash water, enables the removal of nearly all of the occluded salts and most of the water in a second aqueous phase obtained by a further phase separation step. The removal of salts is desirable because salts remain in the bottoms in subsequent distillation and cause difficulty in the removal of the bottoms product from the still. In some cases satisfactory results can be obtained by a single acidification step to about pH 9, this makes it possible to remove most of the salt but it is not as advantageous from the standpoint of eliminating sulfur compounds.

The remaining organic layer is then air blown for a period upwards of about 5 hours, 20 hours usually being sufficient, at a temperature which is preferably in the range of about 100° to 200° F., e. g. about 150° F., at atmospheric pressure or under a slight superatmospheric pressure which need not exceed 4 or 5 atmospheres. The air blowing of the impure acids produced as hereinabove described has been found to be remarkably effective, and at a temperature of 150° F. and in the absence of added catalyst, air blowing for approximately 20 hours is usually sufficient to reduce the copper number to very nearly zero.

The air blown material is then vacuum distilled to remove water (and any light hydrocarbons that may be present) and to separate purified cresols from disulfied bottoms which may contain about 16% to 18% sulfur. The distillation temperature preferably should not exceed about 265° F. since any higher temperature, in most cases, tends to decompose the disulfides and to increase the sulfur content of the purified cresols. With some materials the distillation or stripping temperature may be as high as 300° F. without excessive decomposition of disulfides. The use of steam or inert gas stripping may be employed for recovering purified cresols from the disulfide bottoms, but subatmospheric pressures are usually required to prevent stripping temperature from substantially exceeding 265° F.

The purified cresols thus obtained, and particularly the higher boiling fractions thereof, may have an unpleasant odor and the copper number of the vacuum distilled cresols may be up to about 5 to 10 because of disulfied conversion which may take place even under vacuum distillation conditions. We have found, however, that by simply air blowing the purified cresols from the vacuum distillation step, they may be dried and converted into products of good odor which require no further distillation, which have a sulfur content of less than .1% and which have a zero copper number. The copper number is simply the number of milligrams of mercaptan sulfur per 100 milliliters of solution.

The invention will be more clearly understood from the following detailed description of a specific example thereof read in conjunction with the accompanying drawing which is a schematic flow sheet illustrating the essential sequence of steps to be employed.

In this example, a crude caustic cresylate solution 10 is obtained by washing a cracked naphtha fraction boiling chiefly in the range of 200° to 400° F. with an aqueous caustic soda solution containing about 25% by weight of sodium hydroxide. The caustic concentration is not critical and may be in the range of 10% to 50% or more by weight, and potassium hydroxide may be employed instead of sodium hydroxide. The extract may be substantially saturated with cresols in the form of caustic cresylates and mercaptans in the form of mercaptides. The solution will also contain some entrained or solutized oil, and if the solution contains appreciable amounts of oil, such oil may be largely removed by washing the solution with a hydrocarbon of lower boiling range, such as hexane, or a light naphtha fraction 11 which may not only wash out but to some extent replace the original oil 12 contained in the solution so that in the succeeding vacuum distillation step, it may be more easily separated from purified cresols. Other means are known for removing at least the bulk of any oil which initially may be present.

To the crude caustic cresylate solution, sufficient acid 13 is added to give a hydrogen ion concentration in the aqueous phase of about pH 10. In this particular example, sulfuric acid of 40% concentration is employed, but carbon dioxide or other acids may be used in this partial acidification or springing step. While the concentration of the added sulfuric acid is not critical, it is of critical importance that the amount of acid be sufficient to result in the defined aqueous phase hydrogen ion concentration. If the pH of the aqueous phase is as high as 10.8, only about 77.5% of the total cresol separates out in the organic layer and this organic layer contains 43% of the total sulfur contained in the original solution. If sufficient acid is added to give a pH of 10.2, 85% of the total cresol separates out in the organic layer and the organic layer contains only about 40.5% of the total sulfur in the original solution. If sufficient acid is added to give a pH of 9.4, about 93% of the total cresol appears in the organic layer, but this organic layer will now contain almost 70% of the total sulfur contained in the original solution. If the pH is 9.2, 95.5% of the total cresols are in the organic layer, but the organic layer now contains 88% of the total original sulfur. From the above data, it will be seen that the pH at this point should be approximately 10 because at higher pH there is a marked loss in recoverable cresol and at lower pH there is a drastic increase in the sulfur content of the organic layer. It appears that the additional cresols which are separated out or sprung by decreasing the pH from about 10 down to 9.8 are largely thio cresols. By initially springing the cresols at a pH of about 10, e. g. about 9.5 to 10.5, or preferably 9.8 to 10.2, most of the acidic sulfur compounds are left in the aqueous phase and of the 10% to 20% of the total cresols which remain in the aqueous phase most of them appear to be thio cresols.

After separating the first aqueous phase 14 in the initial separation step 15, the remaining organic layer will not only be much freer of sulfur compounds and other impurities, but it will be much smaller in volume and, therefore, more easily processed in the remaining steps. This organic layer, however, contains a considerable amount of water and salts which are occluded or solutized under the conditions of the first phase separation, and it is desirable to remove as much of such salts and water as possible. Additional acid 16 is, therefore, added to the organic layer in an amount to obtain a hydrogen ion concentration below about pH 9 and to give a hydrogen ion concentration which is preferably about pH 7.5 to 8.5. Here again the acid employed may be a 40% sulfuric acid or other known acids of various strengths. Before the aqueous phase is removed in second separation step 17, a small amount of wash water 18 is preferably added to facilitate the salt removal. By retaining at least a part of the salt-containing water in the organic layer when the wash water is added, emulsification difficulties are avoided. The amount of wash water is not critical and it may be from about one-third to the total amount of aqueous phase which is formed at this point. Instead of adding the wash water before removal of the second aqueous phase 19, about a half to two-thirds of the second aqueous phase may be removed and about half to an equal amount of wash water may be then added and mixed with the organic phase prior to withdrawal of the remainder of the second aqueous phase. There appears to be no problem of carboxylate removal (note U. S. 2,391,839) since the organic material apparently contains no carboxylic acids or carboxylic acid salts.

After the second phase separation for removing in this case at least a portion of the water and sodium sulfate, the remaining organic layer is oxidized at 20 with air or oxygen introduced at 21 in an amount in excess of that required to convert the mercaptans to disulfides. The excess of oxygen is important in order to insure that the conversion occur rapidly and to completion. In this particular example, the organic layer is blown with air for about 20 hours at a temperature of 150° F. at about atmospheric pressure. The air blow temperature may be within the general range of about 100° to 200° F. or more (but below about 250° F.), the higher temperatures requiring less time but requiring more equipment for avoiding vaporization losses. Elevated pressures may be employed but atmospheric pressure is adequate and pressures above about 5 atmospheres are usually not warranted. In this air blowing step, the copper number of the sprung cresols or cresylic acids is reduced to substantially zero and it is important to note that no expensive oxidation catalysts are required. For comparison, it might be pointed out that when air blowing is used on the caustic cresylate solution, the blowing time of 60 hours at about 160° F. in the presence of hydroquinone as an oxidation catalyst cut the copper number down to only about 500 (although the blowing of the caustic solution appeared to be more effective in laboratory tests).

After the air blowing step, the organic material is subjected to vacuum distillation 22 at a pressure which is preferably not higher than 50 mm. absolute so that the distillation temperature can be held below about 265° F. Any remaining water and light hydrocarbons are removed as a light cut 23. The lower boiling cresols (phenol, etc.) are then taken overhead in a state of remarkable purity. The higher boiling cresols may have a copper number of from 5 to 10 because of mercaptan regeneration in the distillation step, but such mercaptan regeneration (or disulfide decomposition) can be substantially avoided by preventing the temperature from exceeding about 265° F. and by using steam or gas stripping to supplement and help the vacuum distillation. The disulfide bottoms 24 produced in the vacuum distillation are characterized by a sulfur content of the order of 16% to 18%.

An average cresol product from the vacuum distillation step may have a copper number of the order of about 5 to 10 and in order to sweeten this product, it is blown for a short time in sweetening step 25 with air introduced at 26. The conditions for this air blowing step are substantially the same as hereinabove set forth for air blow step 20 except that a shorter period of time may be required to obtain as a final product a dry cresol composition characterized by a good odor, a total sulfur content of less than .1%, and a zero copper number.

While we have described a specific example of our invention as applied to a specific caustic cresylate solution, those skilled in the art will readily understand from the above description how the invention may likewise be applied to other caustic cresylate solutions wherein the actual composition of the cresols and of the sulfur contaminants may vary somewhat from those in this particular example. Higher boiling cresols may be obtained from higher boiling hydrocarbons produced by cracking operations.

We claim:

1. In a process wherein a crude caustic cresylate solution containing thio-cresols and mercaptides is refined to obtain purified cresols by a combination of steps which include oxidation in an alkaline medium of partially purified cresols for converting mercaptans to disulfides followed by distillation at low temperature and pressure to separate purified cresols from disulfides, the improved method of obtaining preliminary purification which comprises acidifying said solution with an amount of acid sufficient to effect separation of an organic phase from an aqueous phase and to give an aqueous phase having a hydrogen ion concentration higher than 9.4 but lower than 10.8 whereby at least about 80% of the cresols but less than half of the total sulfur content in the crude cresylate solution are present in the organic phase and the organic phase is contaminated by substantial amounts of water and salts, removing the aqueous phase from the contaminated organic phase and further acidifying the contaminated organic phase to obtain a second aqueous phase having a hydrogen ion concentration above 7.5 but below 9, adding wash water to the organic phase after said further acidification and in amounts sufficient to effect separation of contaminating salts and water, and separating said second aqueous phase, salts and water from the organic phase before subjecting it to said oxidation step.

2. The method of claim 1 wherein the solution contains neutral oil higher boiling than light naphtha, which method includes the further step of washing said neutral oil from said solution with light naphtha prior to initial acidification and phase separation whereby neutral oil together with some sulfur compounds are removed from the solution and replaced by a portion of said light naphtha, said light naphtha being ultimately removed from cresols in the distillation step.

NATHAN FRAGEN.
ROBERT M. ALM.

REFERENCES CITED

The following references are of record in the file of this patent:

UNITED STATES PATENTS

| Number | Name | Date |
|---|---|---|
| 2,163,227 | Hund et al. | June 20, 1939 |
| 2,199,208 | Owen | Apr. 30, 1940 |
| 2,391,128 | Cauley et al. | Dec. 18, 1945 |
| 2,494,687 | Bond | Jan. 17, 1950 |